(12) United States Patent
Koenig (10) Patent No.: US 11,769,162 B2
(45) Date of Patent: Sep. 26, 2023

(54) AUTOMATIC MOVIE PERFORMANCE PREDICTOR

(71) Applicant: Errol Avery Koenig, Villanova, PA (US)

(72) Inventor: Errol Avery Koenig, Villanova, PA (US)

(73) Assignee: Errol Avery Koenig, Villanova, PA (US)

( * ) Notice: Subject to any disclaimer, the term of this patent is extended or adjusted under 35 U.S.C. 154(b) by 43 days.

(21) Appl. No.: 16/883,316

(22) Filed: May 26, 2020

(65) Prior Publication Data

US 2021/0374773 A1     Dec. 2, 2021

(51) Int. Cl.
*G06Q 30/0202* (2023.01)
*G06N 20/00* (2019.01)
*G06F 16/78* (2019.01)

(52) U.S. Cl.
CPC ..... *G06Q 30/0202* (2013.01); *G06F 16/7867* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 2006/0235783 A1* | 10/2006 | Ryles | G06Q 40/00 705/35 |
| 2011/0087518 A1* | 4/2011 | Schermer | G06Q 40/06 705/7.29 |
| 2012/0310785 A1* | 12/2012 | Poulin | G06Q 10/04 705/27.1 |
| 2014/0111693 A9* | 4/2014 | Bonet | G06F 16/735 348/571 |
| 2019/0295110 A1 | 9/2019 | Bessen et al. | |
| 2019/0362233 A1* | 11/2019 | Aizawa | G06N 3/084 |
| 2021/0182935 A1* | 6/2021 | Malkiel | G06F 16/3347 |

OTHER PUBLICATIONS

Masrury et al., "A Comparative Study of Hollywood Movie Successfulness Prediction Model," 2019 7th International Conference on Information and Communication Technology (ICoICT),Jul. 24-26, 2019 (Year: 2019).*
Muhammed et al. A Neural Network-Inspired Approach for Improved and True Movie Recommendations, Computational Intelligence and Neuroscience, Published online Aug. 4, 2019. (Year: 2019).*
PCT International Search Report and Written Opinion, PCT Application No. PCT/US21/32070, dated Aug. 23, 2021, 14 pages.

* cited by examiner

*Primary Examiner* — Chesiree A Walton
(74) *Attorney, Agent, or Firm* — Fenwick & West LLP (57) ABSTRACT

A prediction of the performance of a movie is generated in response to receiving an identifier of the movie. Features of the movie are identified and a set of similar movies is identified based on the features. Performance statistics are calculated for the set of similar movies that indicate the average financial performance of those movies and a prediction of performance for the movie is generated based on the performance statistics. The prediction is provided for presentation to a user.

20 Claims, 4 Drawing Sheets

AUTOMATIC MOVIE PERFORMANCE PREDICTOR

BACKGROUND

1. Technical Field

The subject matter described generally relates to computer-generated predictions, and in particular to predicting the performance of movies.

2. Background Information

The movie industry is big business. In 2016, ticket sales in movie theaters generated over $36 billion in revenue in 2016. On top of that, worldwide television and other after-theater video monetization generated almost $300 billion in further revenue. However, production costs are also significant, with the average budget for producing a single movie in the same period being well over $100 million. A successful move can generate large profits, but a flop can result in an equally large loss.

DETAILED DESCRIPTION

The Figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

Overview and Benefits

Whether a given movie is a success can have a significant impact on a wide range of people and other entities. Actors' careers may be advanced or hindered, movie studios may expand or shut down, franchise rights holders may see sequels made or abandoned, to name just a few consequences. The perceived chances of success or failure of a given movie may even determine whether that movie is itself completed or shelved. Traditionally, interested parties often rely on the subjective opinions of critics and other human experts to predict the future performance of a movie. Furthermore, existing approaches rely on proprietary or otherwise hard to access data in generating predictions of a movie's box office performance. Various embodiments are described that provide more objective predictions of the performance of a movie that are based on publicly (or at least more easily) available information.

In one embodiment, a computer-based method for predicting the performance of a movie includes receiving an identifier of a selected movie and identifying a set of features of the selected movie. The method also includes identifying a set of similar movies based on the set of features, with each movie in the set of similar movies having characteristics indicating similarity to the selected movie. Performance statistics are calculated for the set of similar movies that indicate financial performance of the movies in the set of similar movies. The method further includes generating a prediction of performance for the selected movie based on the performance statistics and providing that prediction for presentation to a user.

In various embodiments, the disclosed approach may generate predictions of movie performance that are as least as accurate on average as those of experienced movie critics. Furthermore, these predictions are based on objective data rather than subjective judgments. Furthermore, these predictions may be generated based on readily available information.

Example Systems

Figure 1:
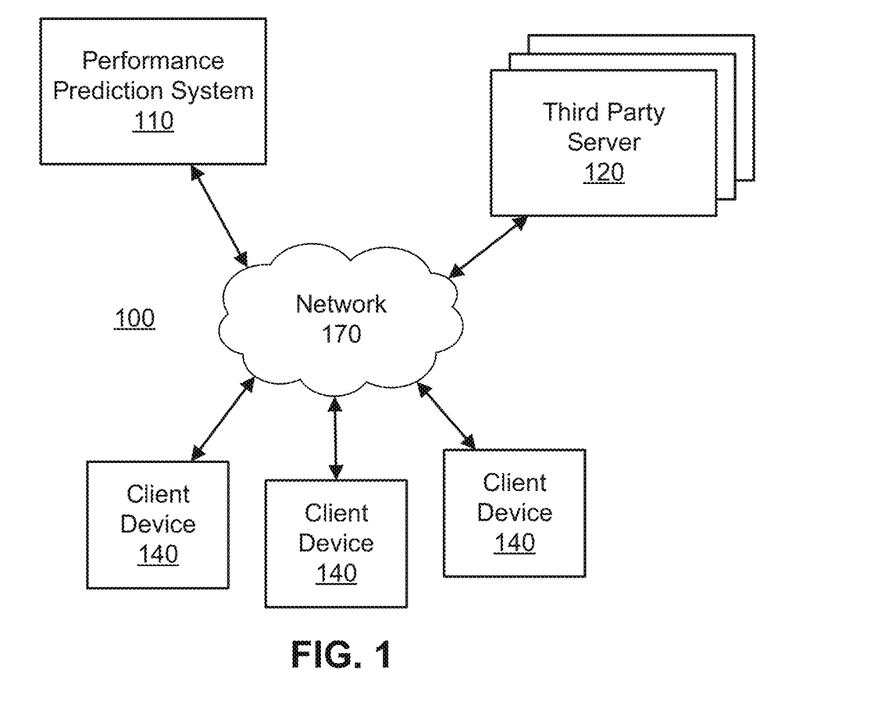
FIG. 1 is a block diagram illustrating a networked computing environment in which movie performance predictions may be provided, according to one embodiment.

FIG. 1 illustrates one embodiment of a networked computing environment 100 in which predictions of movie performance may be provided. In the embodiment shown in FIG. 1, the networked computing environment includes a performance prediction system 110, one or more third party servers 120, and several client devices 140, all connected via a network 170. Although three client devices 140 are shown for illustrative purposes, any number of client devices may be connected to the network 170. In other embodiments, the networked computing environment 100 contains different and/or additional elements. In addition, the functions may be distributed among the elements in a different manner than described. For example, in one embodiment, the performance prediction system 110 does not use any data from third party servers 120. Note that, in some embodiments, the performance prediction system 110 is a stand-alone system, and may not be connected to a network at all.

The performance prediction system 110 generates predictions about the performance of a specific movie. The predictions may be based on information about the movie that is publicly available prior to release and, in some instances, before the movie is completed. Examples of such information include: budget, genre, target demographics, related intellectual property (e.g., copyrighted characters, a novel on which the movie is based, etc.) cast, goal (to win awards, to make money, to sell toys and other merchandise, to build a brand, etc.), whether the movie is considered as a possible award winner (e.g., a likely Oscar nominee), and the like. In some instances, the publicly available information may be supplemented by proprietary studio information. Thus, a studio may be able to generate more accurate predictions of its own movies than those of its competitors. However, the performance prediction system 110 may generate accurate predictions using publicly available information alone. Typically, the predictions are generated pre-release and relate to future performance. That said, in some instances, the prediction may be generated after the fact. For example, a user may wish to compare the prediction generated by the performance prediction system 110 to the actual performance of a movie. Various embodiments of the performance prediction system are described below, with reference to FIGS. 2 and 3.

A third party server 120 is a computer system that the performance prediction system may access (e.g., via the network 170) to obtain data or services. Although the term third party is used, in some instances, a third party server 120 may be controlled by the same entity that operates the performance prediction system 110. In one embodiment, the third party servers 120 host one or more databases of information about movies. These databases might include information such as: title, release date (or scheduled release date), genre, cast, budget, and the like. The performance prediction system 110 may access such information as needed from one or more third party servers 120. For example, the performance prediction system 110 might submit a query including a movie title to a third party server 120 and receive the release date, genre, cast, and budget in response. In some instances, the performance prediction system 110 may retrieve different information from different third party servers 120. For example, cast information might be obtained from one source while budget is obtained from another. Alternatively, as noted previously, some or all of this information may be stored by the performance prediction system 110.

The client devices 140 are computing devices capable of receiving user input as well as transmitting and receiving data via the network 170. The client devices 140 can take various forms such as desktop computers, laptop computers, personal digital assistants (PDAs), mobile telephones, smartphones, and other suitable devices. In one embodiment, the client devices 140 provide an interface (e.g., a webpage presented in a browser, an app, etc.) with which users may interact with the performance prediction system 110. The user identifies a movie and the client device 140 queries the performance prediction system 110 for a prediction of performance for the identified movie. The prediction may be generated in response to the query or predictions may be pre-generated, with the performance prediction system 110 looking up the prediction for the identified movie in response to the query. Alternatively, a hybrid approach may be used where the performance prediction system 110 generates a prediction for a movie the first time it is requested and then stores the generated prediction in a database. Thus, when the performance prediction system 110 receives a query, it may check whether an existing prediction for the movie exists and, if not, generate a new prediction. Regardless of how the prediction is generated, the performance prediction system 110 sends it to the client device 140 for presentation to the user.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Figure 2:
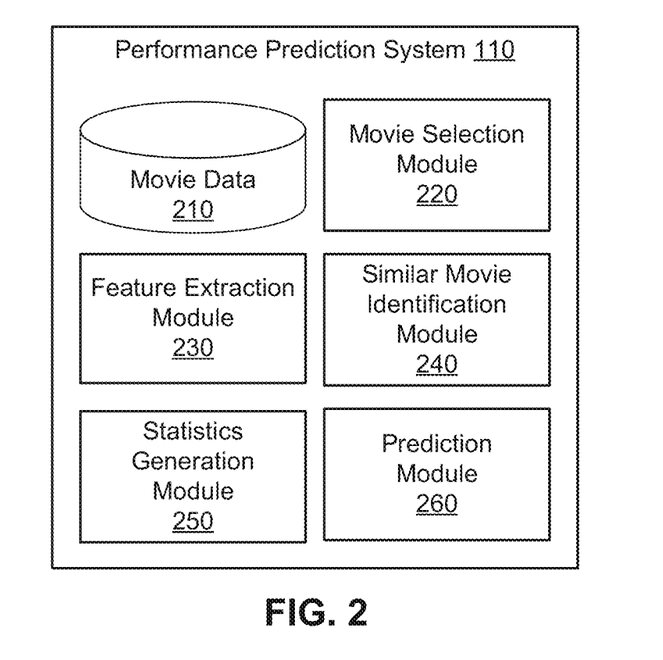
FIG. 2 is a block diagram illustrating a performance prediction system, according to one embodiment.

FIG. 2 shows one embodiment of the performance prediction system 110. In the embodiment shown in FIG. 2, the performance prediction system 110 includes movie data 210, a movie selection module 220, a feature extraction module 230, a similar movie identification module 240, a statistics generation module 250, and a prediction module 260. In other embodiments, the performance prediction system 110 contains different and/or additional elements. In addition, the functions may be distributed among the elements in a different manner than described. For example, rather than extracting features from the movie data 210, some or all of the features may be obtained from a third party server 120.

The movie data 210 is information about movies stored in one or more computer-readable media. Although the movie data 210 is shown as a single entity, it may be stored on multiple devices at multiple locations. For example, the movie data 210 might be stored in a distributed database that is accessed by the performance prediction system 110 via the network 170. One embodiment of the movie data 210 is illustrated in FIG. 3.

Figure 3:
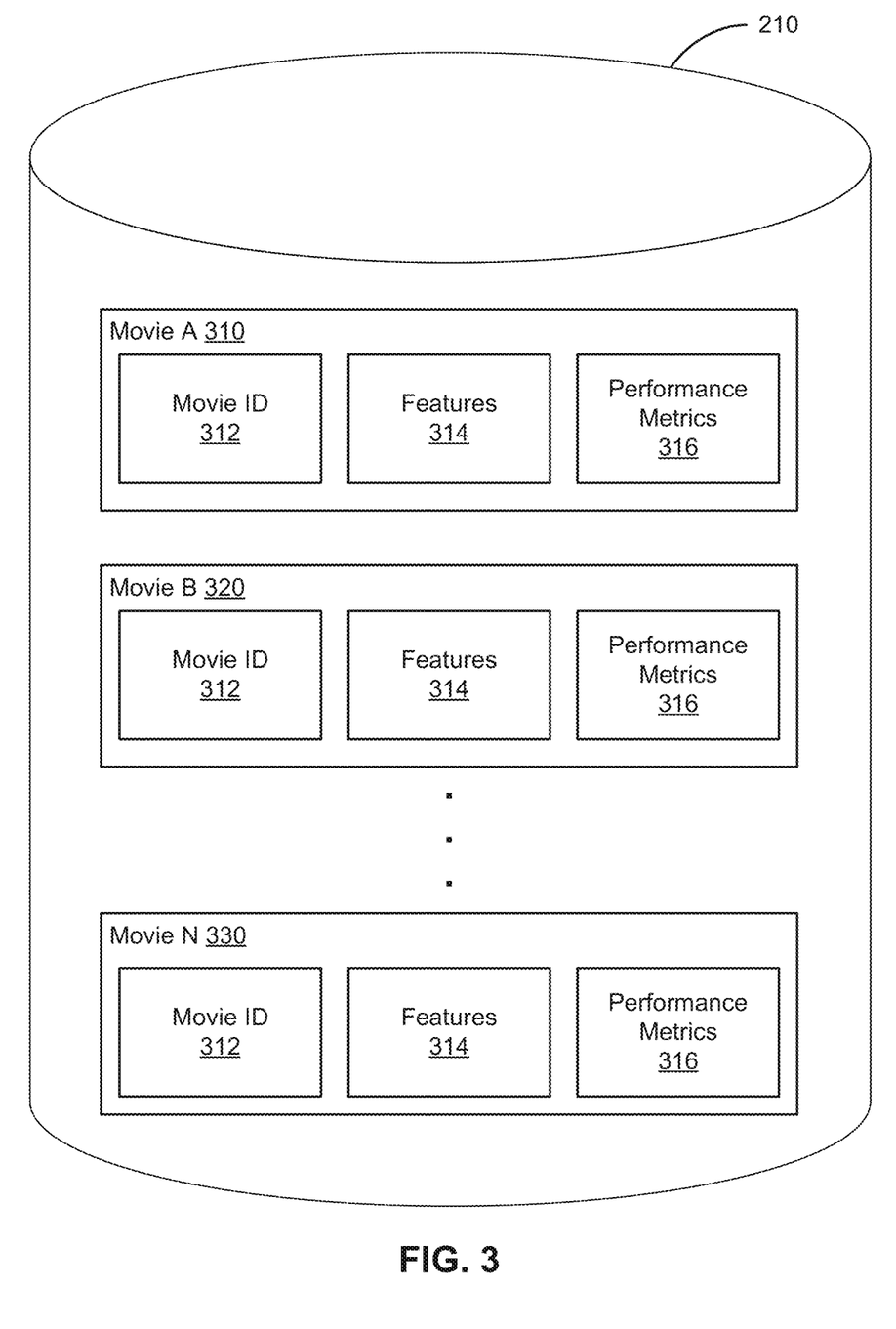
FIG. 3 is a block diagram illustrating the movie database of the performance prediction system shown in FIG. 2, according to one embodiment.

In the embodiment shown in FIG. 3, the movie data 210 includes information about several movies, movie A 310 and movie B 320 through movie N 330. For each movie, the movie data 210 includes a movie ID 312, features 314, and performance metrics 316. The movie ID may be the title, a unique identifying number assigned to the movie, or any other data that may be used to identify the particular movie. Where the movie title is used and there are multiple movies with the same title (e.g., remakes), additional information such as the year of release may be included as part of the movie ID 312 to distinguish between the movies.

The features 314 are information about the movie that may be used to classify it and determine similarity to other movies. In one embodiment, the features include the previously mentioned information available prior to release, such as budget, genre, target demographics, related intellectual property, cast, goal. Other examples of features include release dates (e.g., movies released in proximity to holidays are often similar), the origin of the underlying story (e.g., movies based on foreign folk tales versus domestically generated stories), and whether the movie is considered as potentially award winning. Some or all of these features may be obtained from third party services, such as BOX OFFICE MOJO, IMDB, THE-NUMBERS.COM, etc. A set of features 314 can be represented as a vector with an element holding a value for each feature in the set, referred to as a feature vector. Note that, in some embodiments, the performance prediction system may obtain some or all of the features 314 from a third party server 120 as needed, rather than storing them as part of the movie data 210.

The performance metrics 316 provide information about how the movie performed. In one embodiment, the performance metrics 316 include worldwide box office receipts, domestic box office receipts, domestic opening weekend box office receipts, and worldwide opening weekend box office receipts. In other embodiments, the performance metrics 316 may include different or additional measures of movie performance. For example, for movies that have become available for streaming or television, the performance metrics 316 may include total views and revenues from these platforms.

Referring again to FIG. 2, the movie selection module 220 provides an interface with which a user can select the movie for which a prediction is desired. In one embodiment, the movie selection module 220 provides a website accessible via a client device 140. The website includes a form that a user of the client device 140 fills out to select the movie. The form may solicit the title of the movie in a free text field, provide a search function based on one or more parameters (title, keyword, actor, director, genre, studio, etc.), or provide a list of movies (e.g., in a drop down). Alternatively, the form may solicit additional information about the movie that is used to generate the prediction. For example, the form may direct the user to enter the cast (e.g., lead actors), budget, genre, target demographic, etc. Each feature may be entered via a free text field, from a drop down list, or the like.

In another embodiment, the movie selection module 220 provides an application programming interface (API) via which software running on a client device (e.g., an app) enables a user to select a movie. The interface provided by the software may operate in substantially the same way as the various options described above for a website. In a further embodiment, the movie selection module 220 provides a similar interface at the performance prediction system 220. For example, where the performance prediction system 220 acts as a stand-alone system or is provided as a complete software package, the interface may be provided on the same device (e.g., a client device 140) that generates the prediction.

The feature extraction module 230 identifies features of the selected movie that may be used to generate a prediction of the movie's performance. In one embodiment, the feature extraction module 230 queries a database (e.g., movie data 210) with the title or movie ID 312 of the selected movie for the corresponding features 314. The feature extraction module 230 may alternatively or additionally collect information from one or more third party servers 120 and/or information may be provided by the user as part of the movie selection process. Regardless of the source or sources of the information, the feature extraction module 230 extracts the desired features. The extracted features may be used to define a feature vector for the selected movie.

The similar movie identification module 240 compares the features of the selected movie to features 314 of other movies (e.g., stored in the movie data 210) to identify a set of similar movies. Generally, two movies are considered similar if the corresponding features 314 are similar. For example, two movies that star up-and-coming actors (e.g., Hailee Steinfeld, Tye Sheridan, Letitia Wright, Millie Bobby Brown, etc.) are generally more similar than a movie starring one of those actors and an older movie star (e.g., Bruce Willis, Liam Neeson, Harrison Ford, Denzel Washington, etc.), all other things being equal. As another example, two movies released Thanksgiving week are more likely to be similar than a movie released that week and a summer-release movie.

In various embodiments, the similar movie identification module 240 determines a distance between the selected movie and each movie in the movie data 210. In one embodiments, the distance is based on a set of similarity metrics. To calculate the similarity metrics for a pair of movies, the similar movie identification module 240 compares the value of a particular feature of one movie with the value of the same feature of the other movie. The similarity metrics for a pair of movies may be combined (e.g., using a weighted combination function) to generate a single distance score indicating the similarity between the movies. Thus, movies for which lots of features have similar values will generally be considered more similar than movies that only share a few similar features.

To give a specific example of a similarity metric, to compare the lead actors in two movies, the similar movie identification module 240 can compare demographic information such as age, gender, and race as well as career statistics, such as number of prior movies, number of years since their first movie, number of movies in the last year, etc. to generate a difference score. For data that is not numerical, the difference score may be based on predetermined mappings between categorical values (e.g., French actors may be considered more similar to Belgian actors than Chinese actors). The contribution of each factor considered may be weighted based on its significance. Thus, actors with similar demographic backgrounds and at similar points in their careers generally have high similarity scores (corresponding to a low distance) while actors from different demographic backgrounds with different career trajectories generally have lower similarity scores (corresponding to a greater distance).

In another embodiment, the similar movie identification module 240 calculates a distance between the feature vector of the selected movie and a feature vector for each movie in the movie data 210. In the case of features that are non-numerical, the distance between two values may be determined using a lookup table of predetermined distances. For example, in the case of genre, the distance between science fiction and fantasy might be set to a first value (e.g., one) while the distance between science fiction and documentary might be set to a second, higher value (e.g., ten).

In a further embodiment, the set of similar movies is selected using a machine-learned model, such as a neural network. The machine-learned model is trained prior to run-time by providing human-labelled training data that includes examples of similar and dissimilar movies. The labels may be binary (similar or not similar) or may indicate a similarity score (e.g., out of five). The machine-learned model is applied to the training data and updated (e.g., via backpropagation) until the output provided by the model matches the human-generated labels within a threshold tolerance. Once trained, the model takes the feature vectors of the selected movie and a candidate movie as input. The model outputs a distance indicating the degree to which the selected movie and the candidate movie are similar.

Regardless of the specific approach used, the similar movie identification module 240 selects a set of similar movies based on their distances from the selected movie. In one embodiment, a given movie is included in the set of similar movies if the distance is less than a similarity threshold. Alternatively, the set of movies may be a fixed size, N, with the N movies for which the distance is lowest being included in the set.

In some embodiments, rather than calculating a distance for each movie in the movie data 210, the similar movie identification module 240 first filters based on one or more features. For example, only movies within the same (or a closely related) genre might be considered eligible to be included in the set of movies. The similar movie identification module 240 then calculates a distance score for each movie that passes the filter. This may reduce the processing power requirements where a large number of movies are included in the movie data 260. Alternatively, the set of similar movies may be identified entirely through filtering by applying one or more filters.

The statistics generation module 250 calculates performance statistics based on the set of similar movies. In one embodiment, the performance statistics include a budget to box office metric, a domestic percentage metric, and an average first weekend multiplier. In other embodiments, the performance statistics may include different and/or additional metrics. For example, the metrics for a movie may include the number of theaters that screened the movie overall, overall revenue per theater, the number of theaters that screened the movie on opening weekend, revenue per theater on opening weekend, the length of time for which the movie was in theaters, the dates the movie was in theaters, etc.

The budget to box office metric is a measure of the average ratio between worldwide box office receipts for a movie and its budget for the set of similar movies. The budget to box office metric may be calculated by dividing the world box office receipts (e.g., as indicated in the performance metrics 316) by the budget (e.g., as indicated in the features 314) for each movie in the set, summing the resulting ratios, and dividing by the number of movies in the set.

The domestic percentage metric is a measure of the average percentage of worldwide box office receipts for movies in the set that are made up from domestic (e.g., U.S.) box office receipts. In some embodiments, the performance prediction system 110 may provide a user interface to enable users to select a country that is considered domestic for the purposes of generating the prediction. The domestic percentage metric may be calculated by dividing the domestic box office receipts by the worldwide box office receipts for each movie in the set, summing the resulting ratios, and dividing by the number of movies in the set.

The average first weekend multiplier is a measure of movies in the set perform on opening weekend versus their overall performance. Historically, movies were released on different dates in different countries. Therefore, the average first weekend multiplier may be based on domestic performance. In such cases, the average first weekend multiplier may be calculated by dividing the total domestic box office receipts by the domestic box office receipts for the opening weekend for each movie in the set, summing the resulting ratios, and dividing by the number of movies in the set. However, increasingly movies are released simultaneously worldwide (or at least in a large number of countries), so this ratio may additionally or alternatively be calculated from the total worldwide box office receipts and the worldwide box office receipts for the first weekend.

The prediction module 260 generates a prediction of the performance of the selected movie based on the features of the selected movie and the performance statistics for the set of similar movies. In one embodiment, the prediction includes predictions of total box office receipts, domestic box office receipts, and opening weekend box office receipts. The total box office receipts may be predicted by multiplying the budget for the selected movie by the budget to box office metric generated from the set of similar movies. The domestic box office receipts may be predicted by multiplying the predicted total box office receipts by the domestic percentage metric generated from the set of similar movies. The opening weekend box office receipts may be predicted by dividing the predicted domestic (or worldwide) box office receipts by the first weekend multiplier generated from the set of similar movies.

In another embodiment, the prediction module 260 may generate individual predictions for some or all foreign markets, rather than a single set of aggregated predicted foreign performance metrics. The predictions for a given foreign market may take into account prior performances of movies in similar genres and franchises in that market, as well as the actors and other individuals involved. For example, a Hollywood movie featuring an actor who is from a foreign country (even in a relatively minor role) may be predicted to perform better than other similar movies in that country, particularly if the actor is especially popular in their home country. Conversely, the same movie may perform poorly relative to similar movies in another country that has poor relations with the actor's county.

The prediction module 260 may generate different or additional output tailored to specific use cases. For example, in one embodiment, the prediction model 260 may predict demand for tie-in merchandise for the move. The prediction module 260 may automatically place orders for merchandise, generate contracts for vendors, or create one or more marketing campaigns based on the predicted demand for merchandise. As another example, the prediction model 260 may generate a recommended schedule for a movie theater for the movie (e.g., how many screens on which to show the movie and for how long). As a further example, the prediction module 260 may determine when the movie should launch to optimize likely revenues, which can either be acted on manually or part of an automated process for scheduling release.

In yet another example, the prediction module 260 may output indexes for each role in the movie (e.g., actors, directors, writers, characters, etc.) indicating a predicted impact of each person on the revenues for the movie. In some cases (e.g., where an individual is expected to have a large impact on revenue), the index may be a dollar value or percentage increase (or decrease) in revenue. In other cases (e.g., where the impact of the individual is predicted to be fairly small), the index may be relative to an average for that role (e.g., the ratio of the percentage modifier for the specific individual and the average percentage modifier for the role). Thus, studios my use the indexes to inform choices regarding who to hire for various roles in a project. In a further example, if the prediction model 260 has access to data for streaming movies direct to video, it may output a recommendation to launch on demand or streaming versions of the movie in parallel with, before, or in place of a theatrical release. In other embodiments, the prediction may include different or additional estimates of performance for the selected movie.

Computing System Architecture

Figure 4:
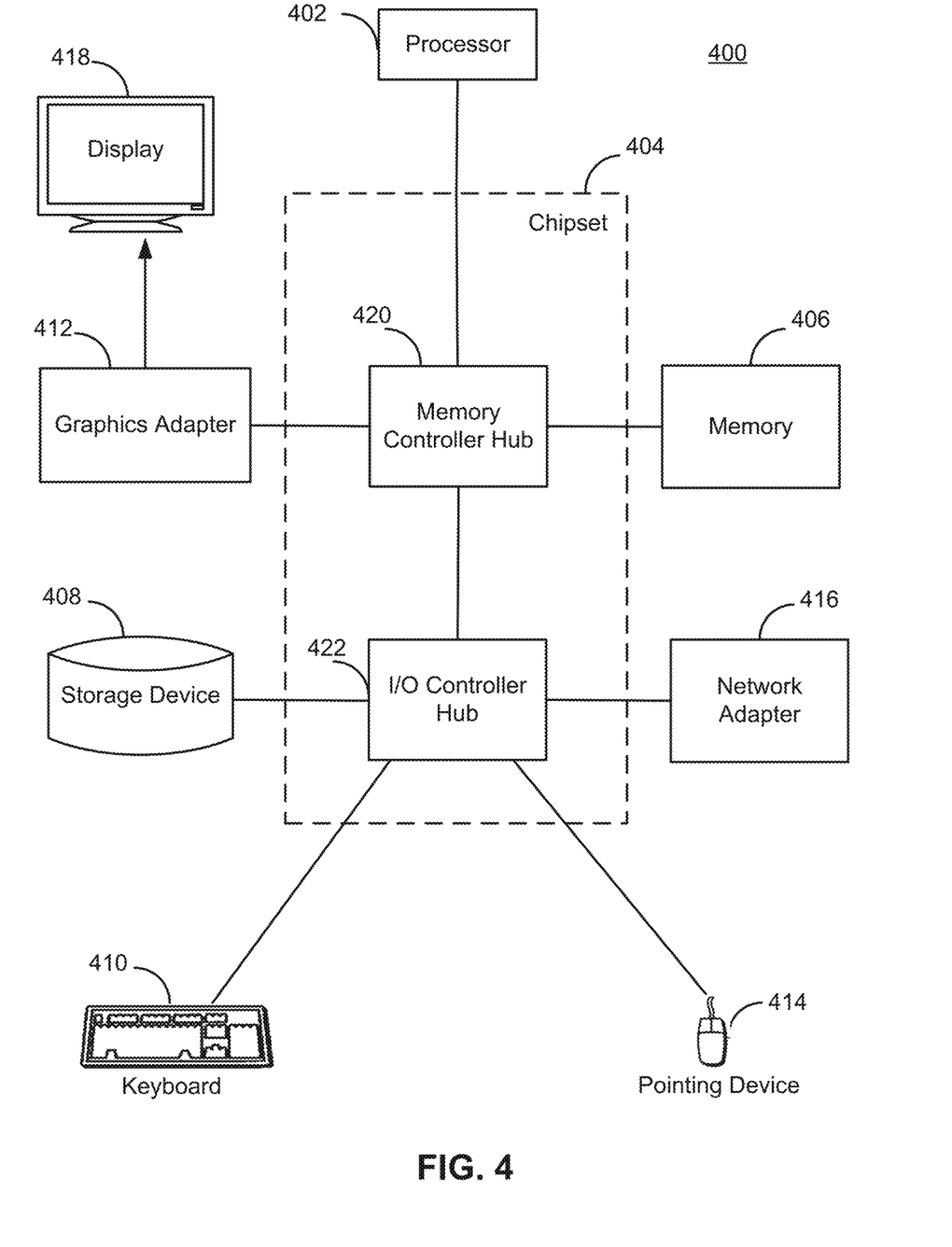
FIG. 4 is a block diagram illustrating an example computer suitable for use in the networked computing environment of FIG. 1, according to one embodiment.

FIG. 4 is a high-level block diagram illustrating an example computer 400 suitable for use in the networked computing environment 100 (e.g., as the performance prediction system 110 or a client device 140). The example computer 400 includes at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display 418 is coupled to the graphics adapter 412. A storage device 408, keyboard 410, pointing device 414, and network adapter 416 are coupled to the I/O controller hub 422. Other embodiments of the computer 400 have different architectures.

In the embodiment shown in FIG. 4, the storage device 408 is a non-transitory computer-readable storage medium such as a hard drive, compact disk read-only memory (CD-ROM), DVD, or a solid-state memory device. The memory 406 holds instructions and data used by the processor 402. The pointing device 414 is a mouse, track ball, touch-screen, or other type of pointing device, and is used in combination with the keyboard 410 (which may be an on-screen keyboard) to input data into the computer system 400. The graphics adapter 412 displays images and other information on the display 418. The network adapter 416 couples the computer system 400 to one or more computer networks (e.g., network 130).

The types of computers used by the entities of FIGS. 1 through 3 can vary depending upon the embodiment and the processing power required by the entity. For example, the movie data 260 might be stored in a distributed database system comprising multiple blade servers working together to provide the functionality described. Furthermore, the computers 400 can lack some of the components described above, such as keyboards 410, graphics adapters 412, and displays 418.

Example Methods

Figure 5:
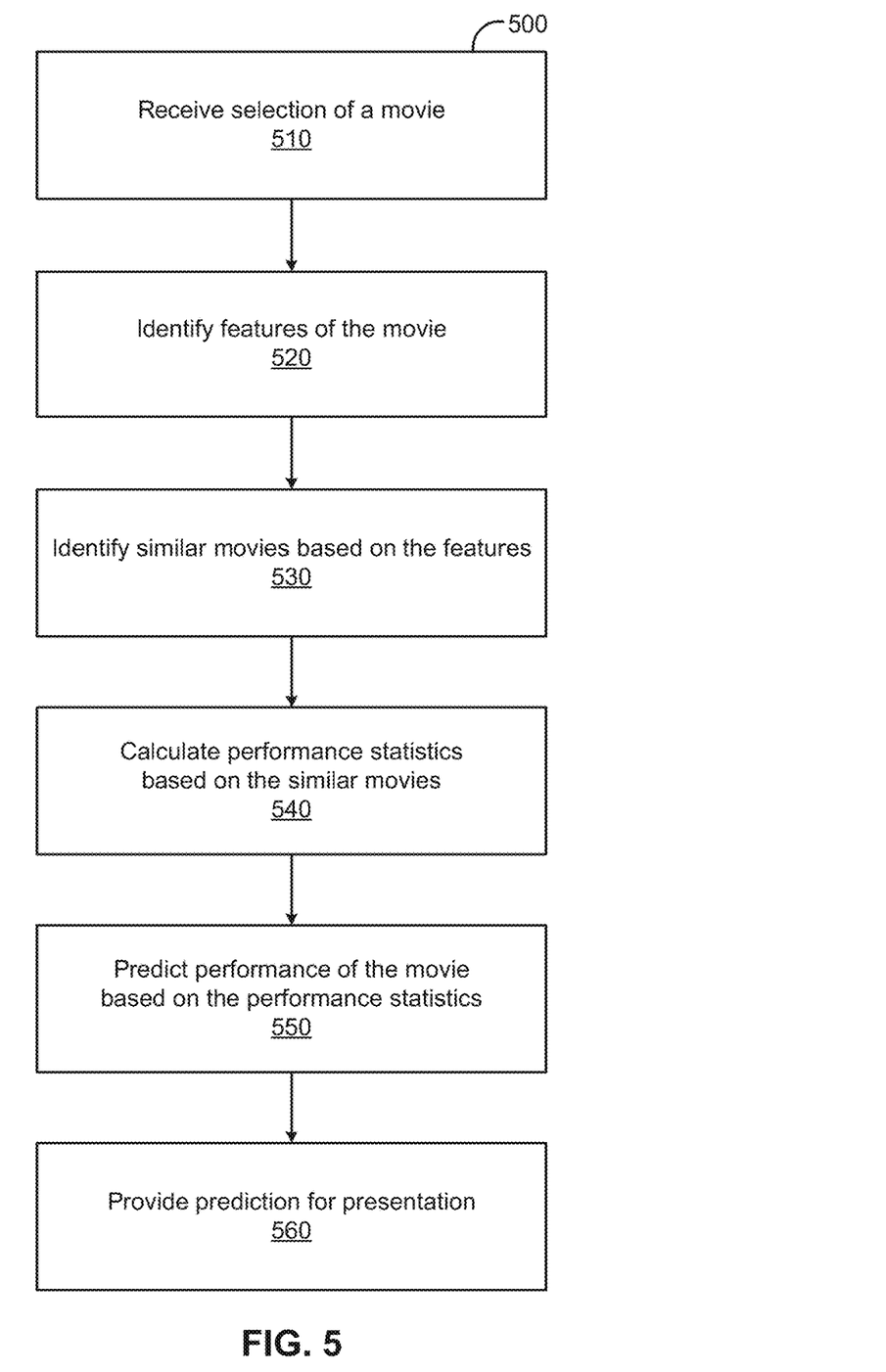
FIG. 5 is a flowchart illustrating a method for predicting the performance of a movie, according to one embodiment.

FIG. 5 illustrates one embodiment of a method 500 for predicting the performance of a movie. The steps of FIG. 5 are illustrated from the perspective of the performance prediction system 110 performing the method 500. However, some or all of the steps may be performed by other entities or components. In addition, some embodiments may perform the steps in parallel, perform the steps in different orders, or perform different steps. For example, the performance statistics for movies may be pre-calculated and stored (e.g., as part of the movie data 210) with the performance prediction system 110 accessing the performance statistics for movies as required.

In the embodiment shown in FIG. 5, the method 500 begins with the performance prediction system 110 receiving 510 a selection of a movie. For the remainder of the description of the method 500, it is assumed that the request was received 510 from a client device 140 for clarity and convenience. However, as described previously the request may also be provided via user input at the performance prediction system 110.

The performance prediction system 110 identifies 520 features of the selected movie. For example, the features might include budget, genre, target demographics, related intellectual property, cast, movie goal, and release date. In one embodiment, the performance prediction system 110 checks whether the features of the selected movie are already available in the movie data 210. For example, if a user has previously requested a prediction for the same movie, the performance prediction system 110 may have stored the features at that time. If the features are not available in the movie data 210, the performance prediction system 110 may obtain them from a third party server 120, solicit them from the user (e.g., by sending a request to the user's client device 140), or obtain them in any other suitable manner. Alternatively, the performance prediction system 110 may check one or more sources for the features (e.g., the movie data 210 and a pre-determined third party server 120) and return an error to the client device 140 if the features are not available.

Based on the features of the selected movie, the performance prediction system 110 identifies 530 a set of similar movies. As described previously, the set can be of a fixed size (e.g., the five to twenty most similar movies, depending on the system configuration or user selected parameters) or can include any movie that meets a predetermined criteria, such as having feature vectors with less than a threshold difference from a feature vector of the selected movie.

The performance prediction system 110 calculates 540 performance statistics for the set of similar movies. For example, the performance statistics for each similar movie may be the previously mentioned budget to box office metric (total worldwide box office receipts divided by total budget), domestic percentage metric (domestic box office receipts divided by total worldwide box office receipts), and average first weekend multiplier (domestic box office receipts divided by domestic opening weekend box office receipts). In one embodiment, the performance prediction system 110 retrieves data regarding each movie in the set (e.g., the budget and performance metrics 316) from the movie data 210. The performance prediction system 110 calculates 540 the performance statistics based on the retrieved data. For example, the performance prediction system 110 can calculate each of the previously mentioned metrics for each move in the set with the performance statistics for the set being an average value of each metric. Various types of average may be used, including the mean or a weighted mean (e.g., with the weight assigned to each movie in the set being based on the similarity of that movie to the selected movie).

The performance prediction system 110 predicts 550 the performance of the selected movie based on the performance statistics. In one embodiment, as described previously, the performance prediction includes three elements: total box office receipts, domestic box office receipts, and opening weekend box office receipts. Which market is considered domestic may be fixed or may be selected by the user. The prediction may be stored (e.g., in movie data 210). In this way, if the performance prediction system 110 receives another request for a prediction of the performance of the selected movie, the stored prediction may be used. Alternatively, a new prediction may be generated if certain criteria are met (e.g., every time a new request is received, if the stored prediction was generated more than a specified time in the past, if more than a specified number of movies have been added to the movie data 210, etc.). In such cases, a user interface may be provided to enable users (e.g., at client devices 140) to view multiple predictions, average predictions, how the predictions have evolved over time, and the like.

Regardless of the specifics of how it is generated, the performance prediction system 110 provides 560 the prediction for presentation. In various embodiments, the performance prediction system 110 sends data describing the prediction (e.g., the value of each element of the prediction) to the client device 140 from which the request originated. The client device 140 presents the prediction to the user. Alternatively, the prediction is sent to the user via an alternate communication channel associated with the user. For example, the prediction could be sent to the user via email, instant message, text message, or the like. In one embodiment, the user may select the method of delivery for the prediction when requesting the prediction.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate +/−10% unless another meaning is apparent from the context. From example, "approximately ten" should be understood to mean "in a range from nine to eleven."

Upon reading this disclosure, those of skill in the art will appreciate still additional alternative structural and functional designs for a system and a process for predicting the performance of movies. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

The invention claimed is:

1. A computer-implemented method for predicting the performance of a movie, the method comprising:
   iteratively training a neural network using labeled training data until the neural network reproduces labels of the labeled training data within a threshold tolerance;
   receiving an identifier of a selected movie for which performance statistics are not available;
   identifying a set of features of the selected movie;
   automatically identifying a set of similar movies by applying the set of features as input to the neural network, the neural network generating a distance score corresponding to each of a corpus of candidate movies, the distance score for a given candidate movie indicating a similarity between the given candidate movie and the selected movie, wherein a candidate movie in the corpus of candidate movies is included in the set of similar movies responsive to the distance score corresponding to the candidate movie meeting a condition;
   calculating performance statistics for the set of similar movies, the performance statistics indicating financial performance of the movies in the set of similar movies;
   calculating, based on the performance statistics, an average financial performance of movies in the set of similar movies, the average financial performance including an average budget to box office metric defined as an average of ratios of budget to total box office receipts for each movie in the set of similar movies;
   generating, using the average financial performance, a prediction of financial performance for the selected movie, the prediction of financial performance for the selected movie including a predicted budget to box office metric defined as a ratio of budget and predicted total box office receipts of the selected movie; and
   providing the prediction for presentation.

2. The computer-implemented method of claim 1, wherein the condition is the distance score corresponding to the candidate movie being a lowest distance score of all distance scores calculated for the corpus of candidates movies.

3. The computer-implemented method of claim 1, wherein the condition is the distance score corresponding to the candidate movie being less than a threshold.

4. The computer-implemented method of claim 1, wherein the set of features includes at least one of: budget, genre, target demographics, related intellectual property, cast, goal, whether the movie is a possible award winner, or release date.

5. The computer-implemented method of claim 1, wherein calculating performance statistics comprises:
   retrieving, from a data store, performance data for each movie in the set of similar movies; and
   calculating, based on the performance data, the average financial performance of the movies in the set of similar movies.

6. The computer-implemented method of claim 5, wherein the performance data for a movie includes the budget and total worldwide box office receipts, and calculating the average financial performance comprises calculating the predicted budget to box office metric for the selected movie by:
   calculating, for each movie in the set of similar movies, the budget to box office metric by dividing the total worldwide box office receipts by the budget;
   summing the calculated budget to box office metrics to generate a sum total; and
   dividing the sum total by the number of movies in the set of similar movies.

7. The computer-implemented method of claim 5, wherein the performance data for a movie includes total worldwide box office receipts and domestic box office receipts, and calculating the average financial performance further comprises:
   calculating, for each movie in the set of similar movies, a domestic percentage metric by dividing the domestic box office receipts by the total worldwide box office receipts;
   summing the calculated domestic percentage metrics to generate a sum total; and
   dividing the sum total by the number of movies in the set of similar movies to obtain a predicted domestic percentage metric of the selected movie, wherein the predicted financial performance of the selected movie further includes the predicted domestic percentage metric.

8. The computer-implemented method of claim 5, wherein the performance data for a movie includes total domestic box office receipts and domestic opening weekend box office receipts, and calculating the average financial performance further comprises:

calculating, for each movie in the set of similar movies, a first weekend multiplier by dividing the total domestic box office receipts by domestic opening weekend box office receipts;

summing the calculated first weekend multipliers to generate a sum total; and dividing the sum total by the number of movies in the set of similar movies to obtain a predicted first weekend multiplier of the selected movie, wherein the predicted financial performance of the selected movie further includes the predicted first weekend multiplier.

9. The computer-implemented method of claim 1, wherein the prediction includes at least one of a predicted revenue for the movie in each of a plurality of markets, an order for tie-in merchandise, a recommendation of how many screens a movie theater should dedicate to the movie, a recommendation of when to launch the movie, an indication of a contribution to total revenue of each of one or more roles associated with making the movie, or a recommendation to launch the movie to on demand or streaming services in parallel, before, or in place of a theatrical release.

10. A non-transitory computer-readable storage medium including computer program code for predicting the performance of a movie that, when executed by a computing system, causes the computing system to perform operations comprising:

iteratively training a neural network using labeled training data until the neural network reproduces labels of the labeled training data within a threshold tolerance;

receiving an identifier of a selected movie for which performance statistic are not available;

identifying a set of features of the selected movie;

automatically identifying a set of similar movies by applying the set of features as input to the neural network, the neural network generating a distance score corresponding to each of a corpus of candidate movies, the distance score for a given candidate movie indicating a similarity between the given candidate movie and the selected movie, wherein a candidate movie in the corpus of candidate movies is included in the set of similar movies responsive to the distance score corresponding to the candidate movie meeting a condition;

calculating performance statistics for the set of similar movies, the performance statistics indicating financial performance of the movies in the set of similar movies;

calculating, based on the performance statistics, an average financial performance of movies in the set of similar movies, the average financial performance including an average budget to box office metric defined as an average of ratios of budget to total box office receipts for each movie in the set of similar movies;

generating, using the average financial performance, a prediction of financial performance for the selected movie, the prediction of financial performance for the selected movie including a predicted budget to box office metric defined as a ratio of budget and predicted total box office receipts of the selected movie; and providing the prediction for presentation.

11. The non-transitory computer-readable storage medium of claim 10, wherein the condition is the distance score corresponding to the candidate movie being a lowest distance score of all distance scores calculated for the corpus of candidates movies.

12. The non-transitory computer-readable storage medium of claim 11, wherein the set of features includes at least one of: budget, genre, target demographics, related intellectual property, cast, goal, whether the movie is a possible award winner, or release date.

13. The non-transitory computer-readable storage medium of claim 11, wherein the condition is the distance score corresponding to the candidate movie being less than a threshold.

14. The non-transitory computer-readable storage medium of claim 10, wherein calculating performance statistics comprises:

retrieving, from a data store, performance data for each movie in the set of similar movies; and calculating, based on the performance data, the average financial performance of the movies in the set of similar movies.

15. The non-transitory computer-readable storage medium of claim 14, wherein the performance data for a movie includes the budget and total worldwide box office receipts, and calculating the average financial performance comprises calculating the predicted budget to box office metric for the selected movie by:

calculating, for each movie in the set of similar movies, the budget to box office metric by dividing the total worldwide box office receipts by the budget;

summing the calculated budget to box office metrics to generate a sum total; and dividing the sum total by the number of movies in the set of similar movies.

16. The non-transitory computer-readable storage medium of claim 14, wherein the performance data for a movie includes total worldwide box office receipts and domestic box office receipts, and calculating the average financial performance comprises:

calculating, for each movie in the set of similar movies, a domestic percentage metric by dividing the domestic box office receipts by the total worldwide box office receipts;

summing the calculated domestic percentage metrics to generate a sum total; and dividing the sum total by the number of movies in the set of similar movies to obtain a predicted domestic percentage metric of the selected movie, wherein the predicted financial performance of the selected movie further includes the predicted domestic percentage metric.

17. The non-transitory computer-readable storage medium of claim 14, wherein the performance data for a movie includes total domestic box office receipts and domestic opening weekend box office receipts, and calculating the average financial performance comprises:

calculating, for each movie in the set of similar movies, a first weekend multiplier by dividing the total domestic box office receipts by domestic opening weekend box office receipts;

summing the calculated first weekend multipliers to generate a sum total; and dividing the sum total by the number of movies in the set of similar movies to obtain a predicted first weekend multiplier of the selected movie, wherein the predicted financial performance of the selected movie further includes the predicted first weekend multiplier.

18. A computer system for predicting the performance of a movie, comprising:

a non-transitory computer-readable storage medium comprising executable computer program code, the computer program code comprising instructions for:

iteratively training a neural network using labeled training data until the neural network reproduces labels of the labeled training data within a threshold tolerance;

receiving an identifier of a selected movie for which performance statistics are not available;

identifying a set of features of the selected movie;

automatically identifying a set of similar movies by applying the set of features as input to the neural network, the neural network generating a distance score corresponding to each of a corpus of candidate movies, the distance score for a given candidate movie indicating a similarity between the given candidate movie and the selected movie, wherein a candidate movie in the corpus of candidate movies is included in the set of similar movies responsive to the distance score corresponding to the candidate movie meeting a condition;

calculating performance statistics for the set of similar movies, the performance statistics indicating financial performance of the movies in the set of similar movies;

calculating, based on the performance statistics, an average financial performance of movies in the set of similar movies, the average financial performance including an average budget to box office metric defined as an average of ratios of budget to total box office receipts for each movie in the set of similar movies;

generating, using the average financial performance, a prediction of financial performance for the selected movie, the prediction of financial performance for the selected movie including a predicted budget to box office metric defined as a ratio of budget and predicted total box office receipts of the selected movie; and providing the prediction for presentation; and a processor for executing the computer program code.

19. The computer system of claim 18, wherein the condition is the distance score corresponding to the candidate movie being a lowest distance score of all distance scores calculated for the corpus of candidates movies.

20. The computer system of claim 18, wherein calculating performance statistics comprises:

retrieving, from a data store, performance data for each movie in the set of similar movies; and calculating, based on the performance data, the average financial performance of the movies in the set of similar movies.

* * * * *